US008620133B2

(12) United States Patent
Fujita et al.

(10) Patent No.: US 8,620,133 B2
(45) Date of Patent: Dec. 31, 2013

(54) AUDIO AMPLIFIER

(75) Inventors: Hiroyuki Fujita, Hamamatsu (JP);
Hidehiro Tomoda, Irvine, CA (US)

(73) Assignee: Yamaha Corporation, Hamamatsu-shi (JP)

( * ) Notice: Subject to any disclaimer, the term of this patent is extended or adjusted under 35 U.S.C. 154(b) by 163 days.

(21) Appl. No.: 13/053,688

(22) Filed: Mar. 22, 2011

(65) Prior Publication Data

US 2011/0234916 A1   Sep. 29, 2011

(30) Foreign Application Priority Data

Mar. 23, 2010   (JP) .................................. 2010-065447

(51) Int. Cl.
  *H04N 5/765*   (2006.01)
  *H04N 5/93*   (2006.01)
(52) U.S. Cl.
  USPC .......................................... 386/200; 386/353
(58) Field of Classification Search
  None
  See application file for complete search history.

(56) References Cited

U.S. PATENT DOCUMENTS

| | | | | |
|---|---|---|---|---|
| 6,047,099 | A * | 4/2000 | Oku ............................... | 386/285 |
| 8,175,298 | B2 | 5/2012 | Mitani et al. | |
| 2007/0041278 | A1* | 2/2007 | Tsujimoto ........................ | 369/1 |
| 2008/0123870 | A1* | 5/2008 | Stark et al. ...................... | 381/86 |
| 2008/0240469 | A1* | 10/2008 | Suzuki .......................... | 381/120 |
| 2009/0046210 | A1 | 2/2009 | Sakamoto et al. | |
| 2009/0269036 | A1 | 10/2009 | Mitani et al. | |
| 2010/0132001 | A1 | 5/2010 | Kitano et al. | |
| 2011/0162866 | A1* | 7/2011 | Masakazu et al. ............ | 174/103 |

FOREIGN PATENT DOCUMENTS

| | | |
|---|---|---|
| JP | 2007-124552 A | 5/2007 |
| JP | 2007-192758 A | 8/2007 |
| JP | 2010-4510 A | 1/2010 |
| WO | WO 2007/052625 A1 | 5/2007 |

OTHER PUBLICATIONS

Japanese Office Action with English translation thereof dated Sep. 10, 2013 {4 pages}.

* cited by examiner

*Primary Examiner* — William C Vaughn, Jr.
*Assistant Examiner* — Asher Khan
(74) *Attorney, Agent, or Firm* — Crowell & Moring LLP

(57) ABSTRACT

There is provided an audio amplifier, including: an AV signal acquisition unit that acquires an AV signal; a television connection unit to which a television receiver is connected; a first audio amplifying circuit to which a speaker is connected; and a control unit. The control unit transmits to the television receiver a command to shut off power for a second audio amplifying circuit of the television receiver when outputting the video signal of the AV signal acquired by the AV signal acquisition unit from the television connection unit toward the television receiver and when inputting the audio signal of the AV signal to the first audio amplifying circuit. The control unit shuts off power for the first audio amplifying circuit when outputting the video signal and the audio signal of the AV signal from the television connection unit toward the television receiver.

3 Claims, 4 Drawing Sheets

AUDIO AMPLIFIER

BACKGROUND OF THE INVENTION

1. Technical Field

The present invention relates to an audio amplifier which configures an AV (Audio/Video) system along with a DVD (Digital Versatile Disc) player and a TV receiver.

2. Background Art

An AV system is configured for reproducing an AV content or an audio content by combination of a plurality of audio devices and video devices. The AV system includes a DVD/Blu-Ray disc playback apparatus, an AV amplifier, a television receiver, and others. Sources reproduced by the AV system are a variety of sources, like an optical disc typified by a DVD, and television broadcasts. Some sources to be reproduced encounter a case where any of the devices in the AV system are not used or where some functions of the devices are used while the other functions of the same remain unused.

In the meantime, power of the AV system is usually managed as power for the entire system. When power of the AV system is turned on, all of the devices in the system are collectively supplied with power. Therefore, even when any of the devices or any of the functions are not used, the power is supplied at all times, which runs counter to energy saving. A technique for monitoring power consumption of the AV system is; for instance, a technique, such as that described in connection with JP-2007-192758A.

The technique described in connection with JP-2007-192758A provides a function of summating the power consumed by the entire AV system and displaying the thus-summated power. However, the technique does not provide a power or energy saving function of shutting off power according to an operation mode of the device.

As mentioned above, some sources to be reproduced encounter a case where one of the devices in the AV system includes functions that are in operation and the other functions that are in non-operation. According to the technique described in connection with JP-2007-192758A, it is only possible to summate power consumed by the entire devices, and it is not possible to locate which functions are in operation and which functions are quiescent and shut off power for the non-operated functions.

SUMMARY OF THE INVENTION

Accordingly, the present invention aims at providing an audio amplifier that saves energy of an AV system by shutting off power for, among all functional units of devices contained in the AV system, functional units which are not used for reproducing a source.

There is provided an audio amplifier including; an AV signal acquisition unit that acquires an AV signal; a television connection unit to which a television receiver is connected; a first audio amplifying circuit to which a speaker is connected; and a control unit. The control unit transmits to the television receiver a command to shut off power for a second audio amplifying circuit of the television receiver when outputting the video signal of the AV signal acquired by the AV signal acquisition unit from the television connection unit toward the television receiver and when inputting the audio signal of the AV signal to the first audio amplifying circuit. The control unit shuts off power for the first audio amplifying circuit when outputting the video signal and the audio signal of the AV signal from the television connection unit toward the television receiver.

Even if the audio amplifier of the present invention takes a charge of a function of transferring a part of an AV signal and a function of reproducing and displaying a video signal, when not taking a charge of reproduction of an audio signal, the audio amplifier shuts off power for the audio amplifying circuit. Thus, power and energy can be saved even when main power for the device cannot be shut off.

BRIEF DESCRIPTION OF THE DRAWINGS

In the accompanying drawings.

DETAILED DESCRIPTION OF THE EXEMPLARY EMBODIMENTS

There is provided an audio amplifier, including: an AV signal acquisition unit that acquires an AV (Audio/Video) signal that includes a video signal and an audio signal; a television connection unit to which a television receiver is connected; a first audio amplifying circuit to which a speaker is connected; and a control unit that transmits to the television receiver a command to shut off power for a second audio amplifying circuit of the television receiver when outputting the video signal of the AV signal acquired by the AV signal acquisition unit from the television connection unit toward the television receiver and when inputting the audio signal of the AV signal acquired by the AV signal acquisition unit to the first audio amplifying circuit; and that shuts off power for the first audio amplifying circuit when outputting the video signal and the audio signal of the AV signal acquired by the AV signal acquisition unit from the television connection unit toward the television receiver.

There may be provided an AV system, including: an AV reproducing device that reproduces an AV (Audio/Video) signal that includes a video signal and an audio signal; the audio amplifier; and a television receiver, the AV reproducing device, the audio amplifier and the television receiver being connected in this order, in which the AV signal acquisition unit is a receiving unit that receives the AV signal from the AV reproducing device, the AV reproducing device transmits the reproduced AV signal to the AV signal acquisition unit of the audio amplifier, the television receiver includes the second audio amplifying circuit, an audio power supply circuit for supplying power to the second audio amplifying circuit, and a television control unit, and the television control unit turn off the audio power supply circuit when received from the audio amplifier the command to shut off power for the second audio amplifying circuit.

There is also provided an audio amplifier, including: a television connection unit to which a television receiver is connected and that has a function of inputting an audio signal from the television receiver; a first audio amplifying circuit to which a speaker is connected; and a control unit that, when received an input of the audio signal from the television receiver, inputs the audio signal to the first audio amplifying circuit and also transmits to the television receiver a command to shut off power for a second audio amplifying circuit of the television receiver.

There may be provided the audio amplifier, in which the television connection unit is an HDMI (High Definition Multimedia Interface) connector and inputs the audio signal from the television receiver by use of an ARC (Audio Return Channel) function of the HDMI.

Embodiment

Figure 1:
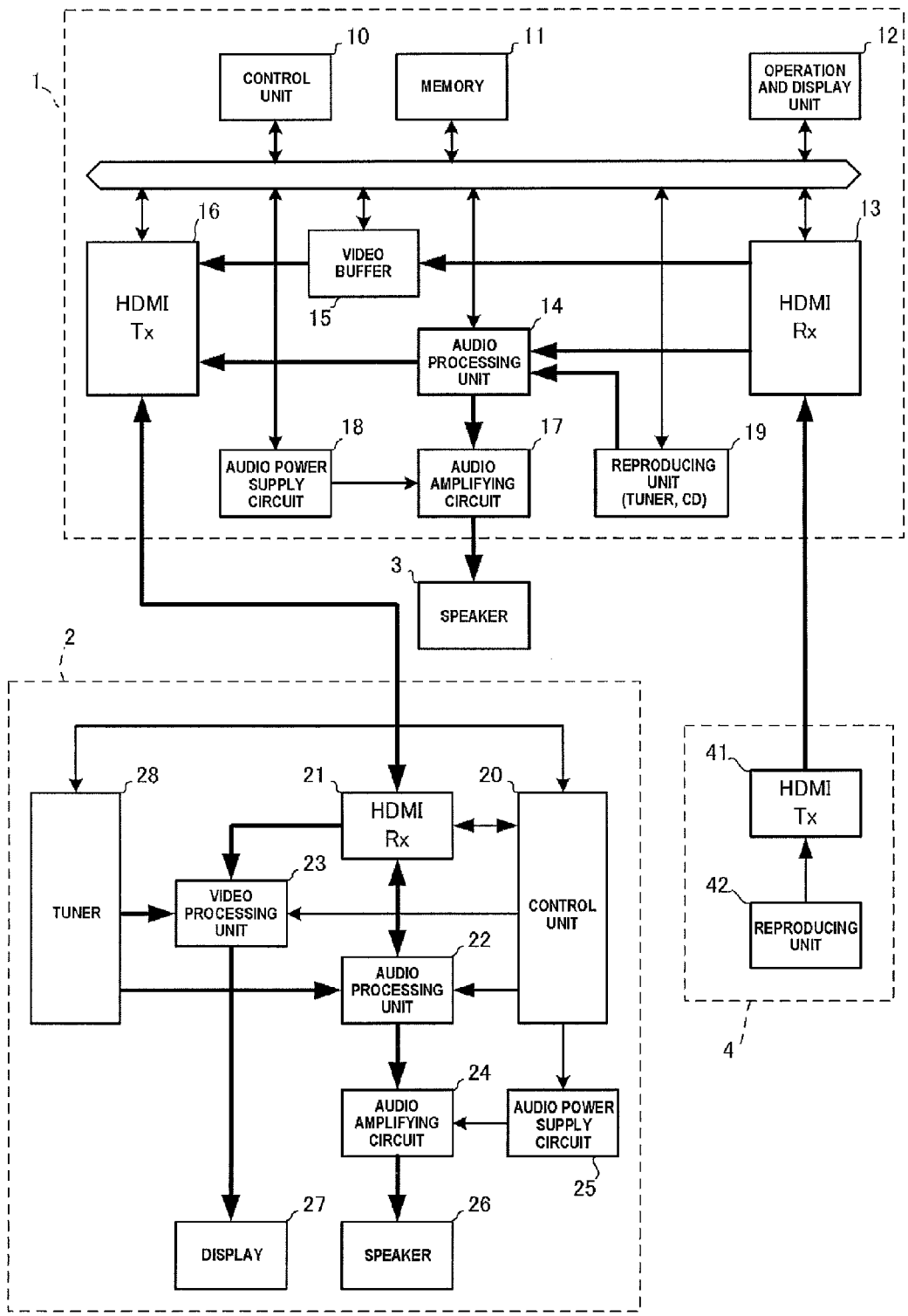
FIG. 1 is a block diagram showing an AV system according to an embodiment of the present invention.

FIG. 1 is a block diagram of an AV system according to an embodiment of the present invention. The AV system includes a television receiver (TV receiver) 2, an AV amplifier 1, and an AV reproducing device 4. The AV amplifier 1 is connected to a speaker 3. The speaker 3 is a 5.1 channel speaker system including; for instance, a center speaker, a front left speaker, a front right speaker, a surround left speaker, a surround right speaker, and a sub-woofer.

The AV reproducing device 4 is; for instance, a DVD reproducing unit, a set-top box, or the like, and reproduces and outputs an AV (Audio/Video) signal which includes a video signal and an audio signal. The AV signal reproduced by the AV reproducing device 4 is input to the AV amplifier 1 by way of an HDMI (High-Definition Multimedia Interface) cable.

When received an input of the AV signal from the AV reproducing device 4, the AV amplifier 1 transfers the video signal of the AV signal to the TV receiver 2. In response to user's switching operation, the audio signal may be emitted from the speaker 3 or transferred to the TV receiver 2 and emitted from a built-in speaker 26 of the TV receiver 2. The AV amplifier 1 and the TV receiver 2 are connected together by way of the HDMI cable.

The AV amplifier 1 includes a control unit 10, a memory 11, an operation and display unit 12, an HDMI receiving unit (Rx) 13, an HDMI transmission unit (Tx) 16, an audio processing unit 14, a video buffer 15, an audio amplifying circuit (a first audio amplifying circuit) 17, an audio power supply circuit 18, and a reproducing unit 19. The control unit 10 controls operation of the entire AV amplifier 1. The memory 11 is a flash memory and a program for controlling operation of the AV amplifier, preset parameters, and the like is stored in the memory 11 in a nonvolatile manner. The operation and display unit 12 receives user's operation and displays a current operating state. The HDMI receiving unit 13 receives an AV signal from an HDMI transmission unit 41 of the AV reproducing device 4. The HDMI transmission unit 16 transmits an AV signal to an HDMI receiving unit 21 of the television receiver 2. The HDMI connector has a function of transmitting a command signal (a CEC command) for controlling a target device in addition to an AV signal and also has an ARC (Audio Return Channel) function of transferring an audio signal from a downstream device to an upstream device.

The audio processing unit 14 is made up of a DSP (Digital Signal Processor); processes an audio signal input from the HDMI receiving unit 13, and outputs the processed signal to the speaker 3 by way of the audio amplifying circuit 17. In accordance with switching operation performed by the user, the audio processing unit 14 also outputs the audio signal to the television receiver 2 by way of the HDMI transmission unit 16. The audio amplifying circuit 17 is activated by the audio power supply circuit 18 that is switched on and off independently of a power supply circuit for other circuits. The control unit 10 controls switching the audio power supply circuit 18 between on and off. The reproducing unit 19 has a tuner for receiving an FM broadcast, a CD player, and the like, and enables the AV amplifier 1 alone, to reproduce an audio signal. The audio signal reproduced by the reproducing unit 19 is input to the audio processing unit 14.

The video buffer 15 temporarily buffers a video signal input by the HDMI receiving unit 13; combines an OSD (On-Screen Display) image, and the like, which are input by the control unit 10 with the buffered image; and outputs the combined image to the HDMI transmission unit 16.

The television receiver 2 includes a control unit 20, the HDMI receiving unit 21, an audio processing unit 22, a video processing unit 23, an audio amplifying circuit (a second audio amplifying circuit) 24, an audio power supply circuit 25, the built-in speaker 26, a display 27, and a tuner 28. The HDMI receiving unit 21 receives an AV signal from the AV amplifier 1. Of the AV signal received by the HDMI receiving unit 21, the audio signal is input to the audio processing unit 22, and the video signal is input to the video processing unit 23. Further, the command signal transmitted by way of the HDMI cable is input to the control unit 20. The tuner 28 is a tuner that receives a digital television broadcast. Of the received television broadcast, the audio signal is input to the audio processing unit 22, and the video signal is input to the video processing unit 23.

The video processing unit 23 decodes the input video signal and displays the decoded video signal on the display 27. The audio processing unit 22 adjusts a sound volume and sound quality of the input audio signal. Further, in response to switching operation performed by the user, the audio processing unit 22 outputs the audio signal to the audio amplifying circuit 24 or the HDMI receiving unit 21. The audio amplifying circuit 24 amplifies an audio signal input by the audio processing unit 22 and emits the amplified signal from the speaker 26. When received an audio signal from the audio processing unit 22, the HDMI receiving unit 21 transfers the audio signal to the AV amplifier 1 by use of the ARC function.

The audio amplifying circuit 24 is activated by the audio power supply circuit 25 that is switched between on and off independently of the power supply circuit for the other circuits. The control unit 20 controls switching the audio power supply circuit 25 between on and off.

The control unit 20 controls operation of the TV receiver 2 in accordance with user's operation or a command (a CEC command) input by the AV amplifier 1. The AV amplifier 1 inputs to the control unit 20; for instance, a command stating that the audio signal received by the tuner 28 should be transferred to the AV amplifier 1 by use of the ARC function, a command stating that the audio power supply circuit 25 is shut off, and others.

Figure 2A:
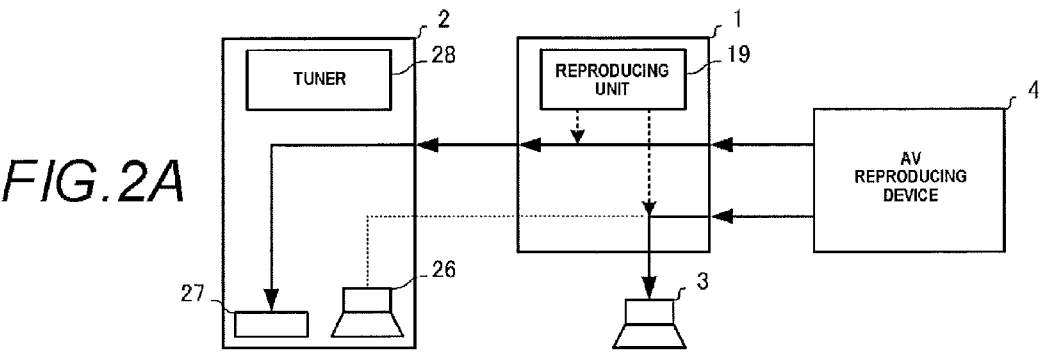
FIGS. 2A to 2D are explanatory views explaining flows of an audio signal in the AV system.
Figure 2B:
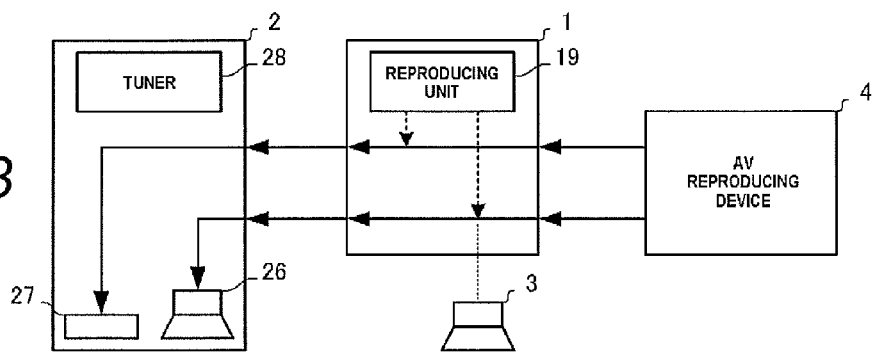

FIGS. 2A to 2D show configurations for reproducing an AV signal (among others, an audio signal) in the AV system. FIGS. 2A and 2B show configurations for reproducing an audio signal read from the AV reproducing device 4 while the AV reproducing device 4 is taken as a source device. FIG. 2A shows a case where the AV amplifier 1 reproduces an audio signal, and FIG. 2B shows a case where the TV receiver 2 reproduces the audio signal. In either case, the television receiver 2 reproduces the video signal.

Figure 2C:
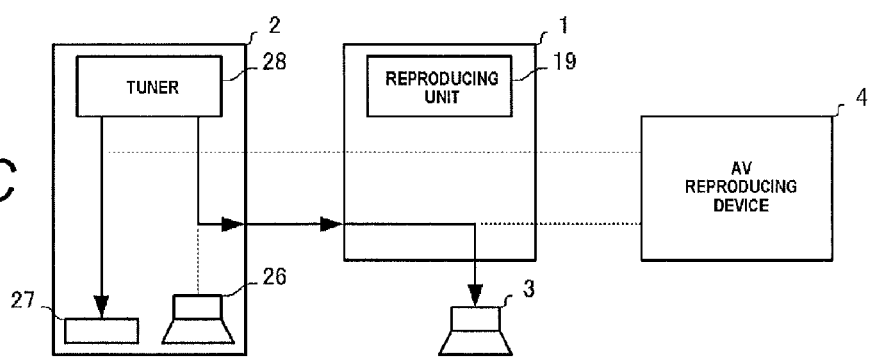
Figure 2D:
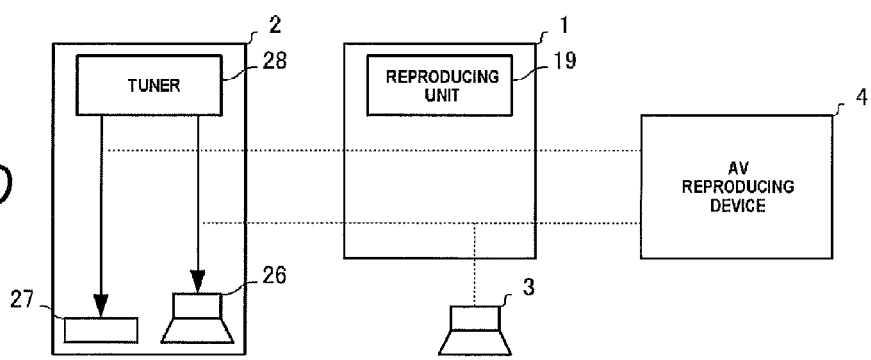

FIGS. 2C and 2D show configurations for reproducing audio and video signals received by the tuner 28 while the tuner 28 of the TV receiver 2 is taken as a source. FIG. 2C shows a case where the audio signal is transferred to and reproduced by the AV amplifier 1 by means of the ARC function, and FIG. 2D shows a case where the television receiver 2 directly reproduces the audio signal. In either case, the television receiver 2 reproduces the video signal.

In the configuration shown in FIG. 2A, the AV amplifier 1 reproduces an audio signal, and therefore the audio amplifying circuit 24 of the television receiver 2 is in a quiescent state. In the configuration shown in FIG. 2B, the television receiver 2 reproduces an audio signal, and hence the audio amplifying circuit 17 of the AV amplifier 1 is in a quiescent mode. However, even in the case of the configuration shown in FIG. 2B, the AV amplifier 1 takes charge of a function of transferring an audio/video signal reproduced by the AV reproducing device 4 to the television receiver 2 by means of relaying operation and also a function of controlling operation of the entire AV system. Therefore, main power cannot be shut off.

In the configuration shown in FIG. 2C, the AV amplifier 1 reproduces an audio signal, and hence the audio amplifying circuit 24 of the television receiver 2 is in a quiescent mode. Further, in the configuration shown in FIG. 2D, the television receiver 2 reproduces the audio signal received by the tuner 28 without modification. Therefore, the AV amplifier 1 does not perform any operation in connection with reproduction of the AV signal. However, since the AV amplifier 1 takes a charge of a function of controlling operation of the entire AV system, the main power cannot be shut off.

As mentioned above, an audio circuit (an audio amplifying circuit) that is separated from the reproducing function, to thus become quiescent, exists in the AV system depending on selection of a source and selection of a device for reproducing an audio signal. When the device does not take a charge of any function in the AV system, the power of the system can be shut off. However, in the case of the foregoing configurations, some functions of both the AV amplifier 1 and the television receiver 2 are used, the main power for these devices cannot be shut off. Therefore, energy saving is accomplished by shutting off only the power of the audio circuit that remains unused.

Figure 3:
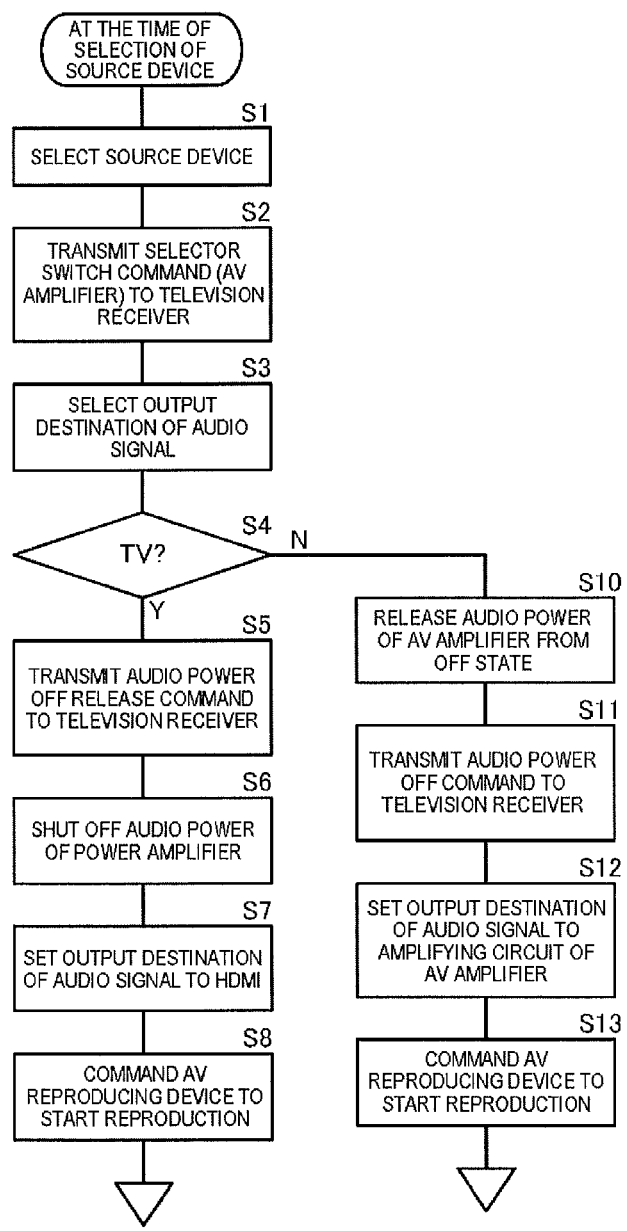
FIG. 3 is a flowchart showing an operation for selecting a source for an AV amplifier and selecting audio reproducing device.
Figure 4:
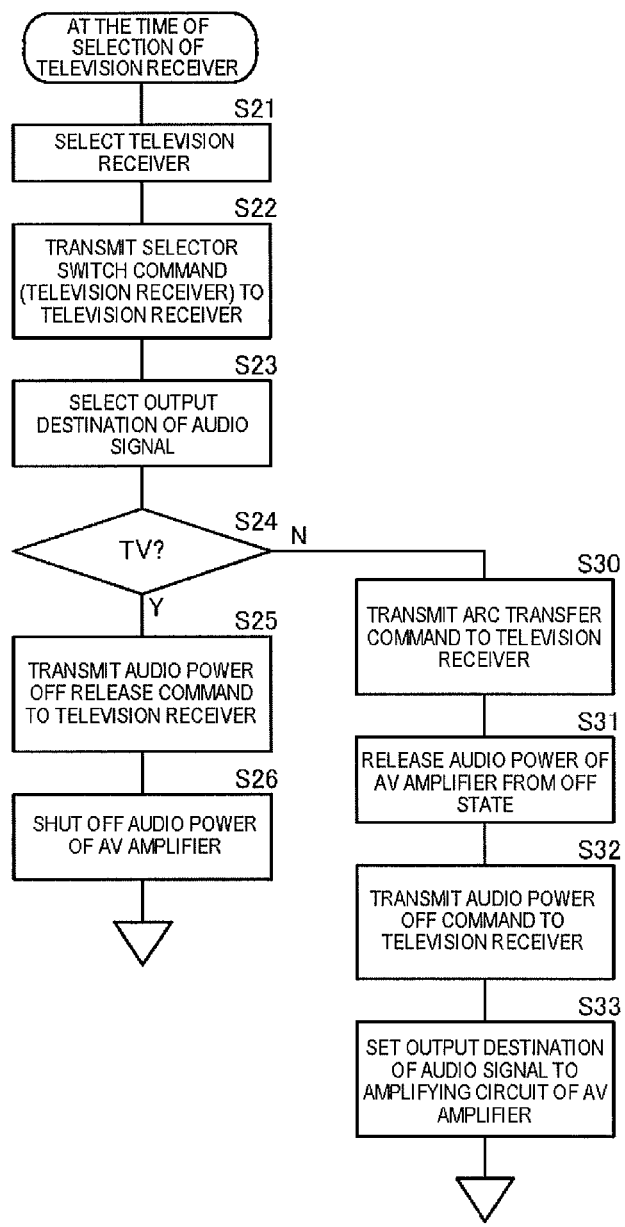
FIG. 4 is a flowchart showing an operation for selecting a source for the AV amplifier and selecting audio reproducing device.

FIGS. 3 and 4 are flowcharts showing operation of the AV amplifier 1 performed when the user has selected a source device.

FIG. 3 shows operation performed when the user has selected the AV reproducing device 4 as an AV content source. When the user has selected the AV reproducing device 4 as a source device (S1), a selector switch command is transmitted to the television receiver 2 (S2). The selector switch command is a CEC command to switch source selection of the television receiver 2 to the AV amplifier 1 (an HDMI input). Selection of an output destination of the audio signal performed by the user is accepted (S3). Specifically, there is accepted a selection as to whether the AV amplifier 1 or the television receiver 2 reproduces an audio signal of the AV signal reproduced by the AV reproducing device 4. When the user selects the television receiver 2, the television receiver 2 can reproduce the audio signal in conjunction with an image (a video signal). Moreover, when the user selects the AV amplifier 1, the television receiver 2 reproduces an image, and the AV amplifier 1 (and the speaker 3) having higher sound quality can reproduce the audio signal.

A selection is determined in S4. When the television receiver 2 is selected, an audio power off release command is transmitted to the television receiver 2 (S5). The command is for turning on the audio power supply circuit 25 of the television receiver, thereby supplying the audio amplifying circuit 24 with power. The audio power supply circuit 18 of the AV amplifier 1 is shut off (S6). It becomes thereby possible to shut off a power supply to the audio amplifying circuit 17 that is not used, thereby saving electric power energy. Subsequently, an output destination of an audio signal from the audio processing unit 14 is set to the HDMI transmission unit 16 (the television receiver 2) (S7), and the AV reproducing device 4 is commanded to reproduce an AV content (S8), thereby causing processing to proceed to reproduction processing.

When the AV amplifier 1 is selected in S4, the audio power supply circuit 18 of the AV amplifier is released from the off state, thereby switching on the power of the audio amplifying circuit 17 (S10), and an audio power off command is transmitted to the television receiver 2 (S11). The command is for switching off the audio power supply circuit 25 of the television receiver 2, thereby halting a power supply to the audio amplifying circuit 24. Subsequently, the output destination of an audio signal from the audio processing unit 14 is set to the audio amplifying circuit 17 (S12), and the AV reproducing device 4 is commanded to reproduce an AV content (S13), thereby causing processing to proceed to reproduction processing.

A message to the effect that the audio power supply circuit 25 of the television receiver 2 or the audio power supply circuit 18 of the AV amplifier 1 has been shut off can be also displayed on a display of the television receiver 2 while combined with the video signal in the video buffer 15 through OSD (On Screen Display) processing.

Although the audio power supply circuits 18 and 25 are switched on or off according to the user's switching operation in the flowchart, it is also possible to monitor an audio signal flowing into the HDMI receiving unit 13 and the HDMI transmission unit 16, to thus detect whether the AV amplifier 1 or the television receiver 2 reproduces the audio signal, and to switch the audio power supply circuit 18 or 25 between on and off according to a detection result.

FIG. 4 is a flowchart showing operation performed when the tuner 28 of the television receiver 2 is selected as an AV content source by the user. When the user selects the tuner 28 of the television receiver 2 as a source device (S21), a selector switch command is transmitted to the television receiver 2 (S22). The selector switch command is a CEC command stating that the source of the television receiver 2 is switched to the tuner 28. The output destination of the audio signal selected by the user is now accepted (S23). Specifically, there is accepted a selection as to whether the AV amplifier 1 or the television receiver 2 reproduces the audio signal of the AV signal received by the tuner 28. When the user selects the television receiver 2, the television receiver 2 can reproduce the audio signal in conjunction with an image (a video signal). Further, when the user selects the AV amplifier 1, the television receiver 2 reproduces the image, whilst the AV amplifier 1 having higher sound quality (and the speaker 3) can reproduce the audio signal.

A selection is made in S24. When the television receiver 2 has been selected, an audio power off release command is transmitted to the television receiver 2 (S25). The command is for switching on the audio power supply circuit 25 of the television receiver 2, thereby supplying the audio amplifying circuit 24 with power. The audio power supply circuit 18 of the AV amplifier is shut off (S26). A power supply to the audio amplifying circuit 17 that is not used is thereby shut off, so that electric energy can be saved.

When the AV amplifier 1 has been selected in S24, the ARC transfer command is transmitted to the television receiver 2 (S30). The command is one for transferring the audio signal received by the tuner 28 to the AV amplifier 1 by way of the ARC (Audio Return Channel). Next, the audio power supply circuit 18 of the AV amplifier is released from the off state, thereby switching on the power for the audio amplifying circuit 17 (S31), and an audio power off command is transmitted to the television receiver 2 (S32). The command is one for shutting off the audio power supply circuit 25 of the television receiver 2, thereby halting a power supply to the audio amplifying circuit 24. Subsequently, an output destination of the audio signal of the audio processing unit 14 is set to the audio amplifying circuit 17 (S33).

In addition to the operations shown in FIGS. 3 and 4, there may be also performed operation for shutting off the main power for devices in the AV system that do not operate at all. For instance, operation is for shutting off the main power for the AV reproducing device 4 when the AV system is operating in the forms shown in FIGS. 2C and 2D, shutting off the main power for the television receiver 2 during playback of a CD, and the like. An essential requirement is that the AV amplifier 1 should switch power between on and off by means of a CEC command transmitted by way of the HDMI. Even when the main power is shut off, a standby circuit including a function for transmitting and receiving an HDMI is left alive.

When the reproduction unit 19 of the AV amplifier reproduces an audio source, such as an FM broadcast and a CD, an audio signal is generally amplified by the audio amplifying circuit 17 of the AV amplifier 1. The thus-amplified audio signal is reproduced by the speaker 3. Even in this case, it is also possible to make an output destination switchable in the manner shown in FIGS. 2A and 2B and to switch a power source between on and off in response to switching action.

In the embodiment, the AV reproducing device 4 is configured so as to reproduce an AV content and input an AV signal to the AV amplifier 1. However, there may be also adopted a configuration in which the AV amplifier 1 has a built-in DVD reproducing unit, a built-in digital television tuner, and others, and reproduces an AV signal in the DVD reproducing unit or the digital television tuner.

What is claimed is:

1. An audio amplifier, comprising:
    an AV signal acquisition unit that acquires an AV (Audio/Video) signal that includes a video signal and an audio signal;
    a television connection unit to which a television receiver is connected;
    a first audio amplifying circuit to which a speaker is connected; and
    a control unit that determines an output destination of the audio signal of the AV signal acquired by the AV signal acquisition unit, wherein
    the control unit transmits to the television receiver a command to shut off power for a second audio amplifying circuit of the television receiver when the control unit has determined that the output destination of the audio signal is the first audio amplifying circuit so that the video signal of the AV signal is output from the television connection unit toward the television receiver and the audio signal of the AV signal is input to the first audio amplifying circuit, and
    the control unit shuts off power for the first audio amplifying circuit when the control unit has determined that the output destination of the audio signal is the second audio amplifying circuit so that the video signal and the audio signal of the AV signal is output from the television connection unit toward the television receiver.

2. The audio amplifier according to claim 1, further comprising:
    an operation unit that receives information indicating the output destination of the audio signal from outside.

3. An AV system, comprising:
    an AV reproducing device that reproduces an AV (Audio/Video) signal that includes a video signal and an audio signal; the audio amplifier defined in claim 1; and a television receiver, the AV reproducing device, the audio amplifier and the television receiver being connected in this order, wherein
    the AV signal acquisition unit is a receiving unit that receives the AV signal from the AV reproducing device,
    the AV reproducing device transmits the reproduced AV signal to the AV signal acquisition unit of the audio amplifier,
    the television receiver includes the second audio amplifying circuit, an audio power supply circuit for supplying power to the second audio amplifying circuit, and a television control unit, and
    the television control unit turn off the audio power supply circuit when received from the audio amplifier the command to shut off power for the second audio amplifying circuit.

* * * * *